US010100562B2

(12) United States Patent
Seo

(10) Patent No.: US 10,100,562 B2
(45) Date of Patent: Oct. 16, 2018

(54) POP-UP DEVICE FOR BUTTERFLY DOOR GRIP HANDLE AND METHOD THEREOF

(71) Applicant: Hyundai Motor Company, Seoul (KR)

(72) Inventor: Won-Gyo Seo, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/379,053

(22) Filed: Dec. 14, 2016

(65) Prior Publication Data

US 2018/0066462 A1    Mar. 8, 2018

(30) Foreign Application Priority Data

Sep. 5, 2016    (KR) .................. 10-2016-0113962

(51) Int. Cl.
| | |
|---|---|
| E05B 85/10 | (2014.01) |
| B60N 3/02 | (2006.01) |
| E05B 85/12 | (2014.01) |
| E05B 81/34 | (2014.01) |

(52) U.S. Cl.
CPC ............ *E05B 85/107* (2013.01); *B60N 3/023* (2013.01); *E05B 81/34* (2013.01); *E05B 85/12* (2013.01); *E05Y 2900/531* (2013.01)

(58) Field of Classification Search
CPC .............. B62D 33/0625; B62D 29/043; B62D 33/0621; B62D 33/06; B62D 33/0617; B62D 25/06; B62D 25/00; E05B 85/10
USPC .... 296/1.02, 102, 190.03, 190.08, 210, 103, 296/77.1, 107.17, 213, 64, 153, 146.7
See application file for complete search history.

(56) References Cited

U.S. PATENT DOCUMENTS

| | | | | |
|---|---|---|---|---|
| 6,676,193 B1* | 1/2004 | Hanagan | ................ | B60J 5/0472 296/146.11 |
| 6,820,918 B1* | 11/2004 | DeBono | ................ | B60J 5/0472 16/289 |
| 7,191,493 B2* | 3/2007 | Vanderpool | ............ | B60N 3/026 16/412 |
| 8,113,561 B2* | 2/2012 | Yamada | ................ | B60N 3/026 296/1.02 |
| 8,128,152 B2* | 3/2012 | Cho | .................... | B60R 13/0243 296/1.02 |
| 8,870,260 B2* | 10/2014 | Le Duc | .................. | B60J 5/0484 296/146.11 |
| 9,080,352 B2* | 7/2015 | Aerts | .................... | E05B 85/103 |

FOREIGN PATENT DOCUMENTS

| | | |
|---|---|---|
| JP | H06-191279 A | 7/1994 |
| JP | 2003-146082 A | 5/2003 |
| JP | 2006-306367 A | 11/2006 |
| JP | 2007-313915 A | 12/2007 |

(Continued)

*Primary Examiner* — D Glenn Dayoan
*Assistant Examiner* — Sunsurraye Westbrook
(74) *Attorney, Agent, or Firm* — Morgan, Lewis & Bockius LLP

(57) ABSTRACT

A pop-up device for a grip handle that is mounted in a butterfly door, the pop-up device may include a grip handle device including a first end portion formed to protrude in a handle shape from a door trim of the butterfly door, a guide device fixed at a predetermined position in the door trim and configured to guide the grip handle device, and a first drive device configured to drive the grip handle device in response to a signal of opening or closing the butterfly door.

10 Claims, 8 Drawing Sheets

(56) References Cited

FOREIGN PATENT DOCUMENTS

| KR | 10-0866897 B1 | 10/2008 |
|---|---|---|
| KR | 10-2011-0135654 A | 12/2011 |
| KR | 10-2013-0033768 A | 4/2013 |
| KR | 10-1327737 B1 | 11/2013 |
| KR | 10-1439007 B1 | 9/2014 |

* cited by examiner

FIG.2
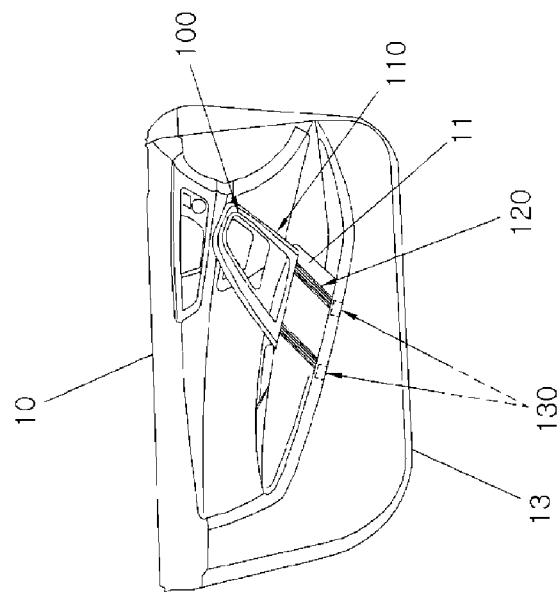
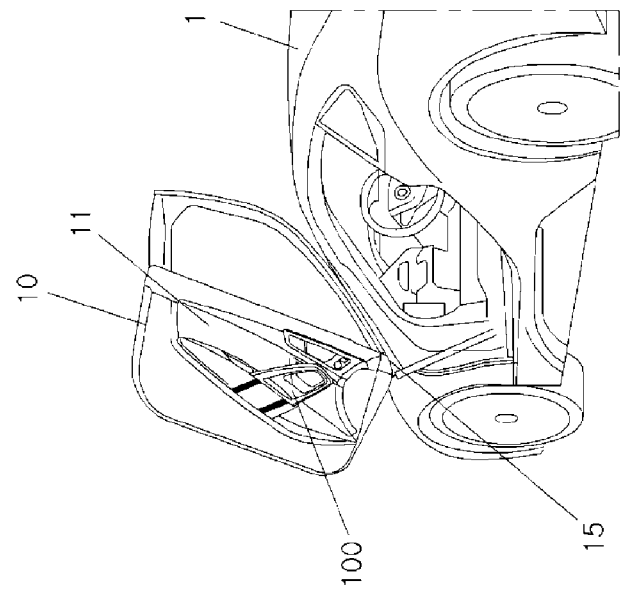

POP-UP DEVICE FOR BUTTERFLY DOOR GRIP HANDLE AND METHOD THEREOF

CROSS-REFERENCE(S) TO RELATED APPLICATIONS

The present application claims priority to Korean Patent Application No. 10-2016-0113962, filed on Sep. 5, 2016, the entire contents of which is incorporated herein for all purposes by this reference.

BACKGROUND OF THE INVENTION

Field of the Invention

Exemplary embodiments of the present invention relate to a pop-up device for a butterfly door grip handle and a method thereof; and, particularly, to a pop-up device for a butterfly door grip handle which is configured to pop up a grip handle device in response to a signal of opening a butterfly door so that a manipulation distance can be reduced when the butterfly door is manually closed, and a method thereof.

Description of Related Art

Generally, internal parts of passenger compartments of vehicles include an instrument panel, an interior material of a ceiling of a passenger compartment, a door trim, etc. The purpose of installation of such internal parts is to enhance the comfortability and secure the safety of occupants.

The door trim of such internal parts not only provides interior decoration effects but also has various functions, for example, assisting in opening or closing a door, functioning as a support on which the arm of a user is placed, or protecting the body of the user when a vehicle collision occurs.

A door trim handle for assisting in opening or closing the door is installed in the door trim. The door trim handle is mainly installed in an armrest of a door trim for vehicles.

FIG. 1 is a perspective view illustrating a grip handle installed in a butterfly door according to a conventional art.

The conventional door trim handle includes a coupling part in a lower end portion thereof so that the door trim handle can be mounted to an armrest of a door trim by the coupling part. An upper end portion of the door trim handle forms a grip handle that protrudes in a typical handle shape. The grip handle has a coupling part by which the grip handle is fixed to the door trim.

With regard to such a door trim handle, a stiffener is added to the door trim so as to enhance the stiffness and the durability, thus improving the marketability and safety of the vehicle.

Meanwhile, there are various door opening types depending on the kind of vehicles. Door types of vehicles are classified into an OEM door, a gull-wing door, a butterfly door, a scissor door, etc. according to a manner in which a door opens or a position of a hinge.

Of them, the butterfly door opens in a manner similar to when a butterfly spreads wings. In the butterfly door, a hinge is mounted to an A filler or a lower part of a windshield frame and a roof. Thus, the butterfly door opens in such a way that it rotates at an angle of 45° around the hinge.

In the case where the conventional door trim handle is applied to a typical OEM door, there is an advantage in that it is easy to open or close the door. However, in the case where the conventional door trim handle is applied to the butterfly door, because the door trim handle is fixed in the door trim, a manipulation distance is comparatively large when an occupant closes the butterfly door, thus inconveniencing the occupant to manipulate the door trim handle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a pop-up device for a butterfly door grip handle which is configured such that a grip handle device is popped up in response to a signal of opening a butterfly door so that a manipulation distance can be reduced when the butterfly door is manually closed, and a method thereof.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, there is provided a pop-up device for a grip handle that is mounted in a butterfly door, the pop-up device including: a grip handle device 110 including a first end portion formed to protrude in a handle shape from a door trim 11 of the butterfly door; a guide device 120 fixed at a predetermined position in the door trim 11 and configured to guide the grip handle device 110; and a first drive device 130 configured to drive the grip handle device 110 in response to a signal of opening or closing the butterfly door.

The grip handle device 110 may be linearly moved by the first drive device 130 in a predetermined first direction.

The first drive device 130 may include: a step motor 131 configured to generate rotating force in response to the signal of opening or closing the butterfly door; a pinion 133 coupled to the step motor 131; and a rack 135 configured to convert a rotational motion of the pinion 133 into a linear motion.

A second end portion of the grip handle device 110 may be coupled to a first end portion of the rack 135 by a coupling roller 113 and guided by the guide device 120.

The first stopper 137 may be provided on a second end portion of the rack 135.

In accordance with another exemplary embodiment of the present invention, there is provided a pop-up device for a grip handle that is mounted in a butterfly door, the pop-up device including: a grip handle device 110 including a first end portion formed to protrude in a handle shape from a door trim 11 of the butterfly door; a hinge device 140 including a hinge rod 141 fixed to a second end portion of the grip handle device 110, and a first bevel gear 143 provided on each of first and second end portions of the hinge rod 141; and a second drive device 150 configured to rotatably drive the grip handle device 110 in response to a signal of opening or closing the butterfly door.

The second drive device 150 may include: a second bevel gear 151 engaging with the first bevel gear 143; and a motor device 153 configured to generate rotating force to be applied to the second bevel gear 151.

The grip handle device 110 may be rotated by a predetermined first angle by the second stopper 160 provided inside the door trim 10.

The hinge rod 141 may be supported by a hinge shaft 145 provided adjacent to the first bevel gear 143.

The grip handle device 110 may have a through hole 111 in an upper end portion thereof.

The grip handle device 110 may be formed to be inclined at an angle ranging from 60° to 90° based on a lower end portion of the butterfly door 10.

In accordance with another exemplary embodiment of the present invention, there is provided a method of popping up a grip handle mounted in a butterfly door, the method including: a first determination operation S110 of determining whether the butterfly door is in an open state; a pop-up operation S120 of popping up a grip handle device 110 when the butterfly door is in the open state in the first determination operation S110; a second determination operation S130 of determining whether the butterfly door is in a closed state after the pop-up operation S120; and a returning operation S140 of returning the grip handle device 110 to an original position thereof when the butterfly door is in the closed state in the second determination operation S130.

The first determination operation S110 may include determining whether the butterfly door is in the open state using an ajar switch.

In the pop-up operation S120, the grip handle device 110 may be linearly moved by a first drive device 130 in a predetermined first direction.

In the pop-up operation S120, the grip handle device 110 may be linearly moved by a predetermined length by a control device.

In the pop-up operation S120, the grip handle device 110 may be rotatably driven by a second drive device 150.

In the pop-up operation S120, the grip handle device 110 may be rotated by a predetermined angle by the control device.

In the pop-up operation S120, the popping-up of the grip handle device 110 may be limited by first and second stoppers 137 and 160.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a perspective view illustrating a pop-up device for a butterfly door grip handle according to various exemplary embodiments of the present invention.

Figure 1:
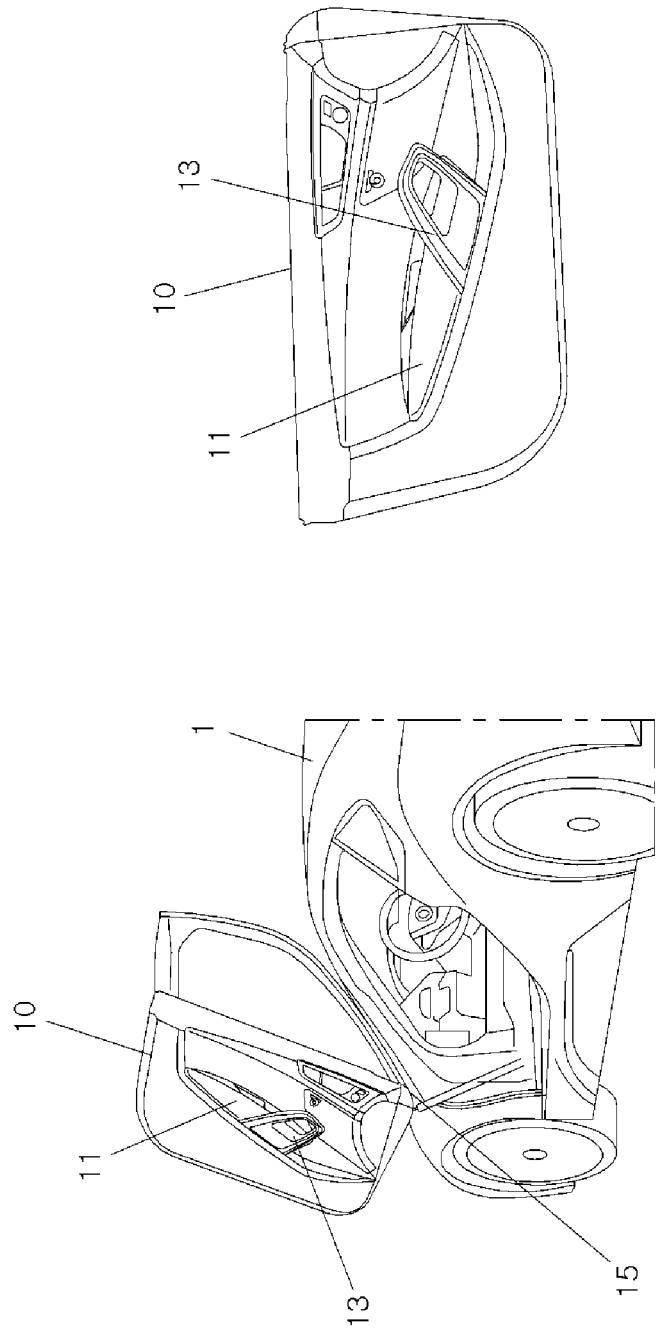
FIG. 1 is a perspective view illustrating a grip handle mounted in a butterfly door according to a conventional art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) may be intended to cover not only the exemplary embodiments, but also various alternatives, modifications, equivalents and other embodiments, which may be included within the spirit and scope of the invention as defined by the appended claims.

Exemplary embodiments of the present invention will be described below in more detail with reference to the accompanying drawings so as to be easily realized by those skilled in the art.

The present invention may, however, be embodied in different forms and should not be construed as limited to the embodiments set forth herein. In certain embodiments, irrelevant to the present invention may be omitted to avoid obscuring appreciation of the disclosure. Throughout the disclosure, like reference numerals refer to like parts throughout the various figures and embodiments of the present invention.

The drawings are not necessarily to scale and in some instances, proportions may have been exaggerated in order to clearly illustrate various layers and regions of the embodiments. It will be understood that when an element such as a layer, a film, a region, or a plate is referred to as being "above" another element, it can be "immediately above" the other element or intervening elements may also be present.

In contrast, when an element is referred to as being "immediately above" another element, there are no intervening elements present. In addition, it will be understood that when an element is referred to as being "entirely" formed on another element, it can be formed on the entire surface (or whole surface) of the other element or cannot be formed at a portion of the edge thereof.

Hereinafter, a pop-up device for a butterfly door grip handle and a method thereof according to embodiments of the present invention will be described in more detail with reference to the accompanying drawings.

In embodiments of the present invention, the words "pop-up" means that a grip handle device is popped out, and this embraces both popping-up in a linear manner and popping-up in a rotating manner.

Figure 3A:
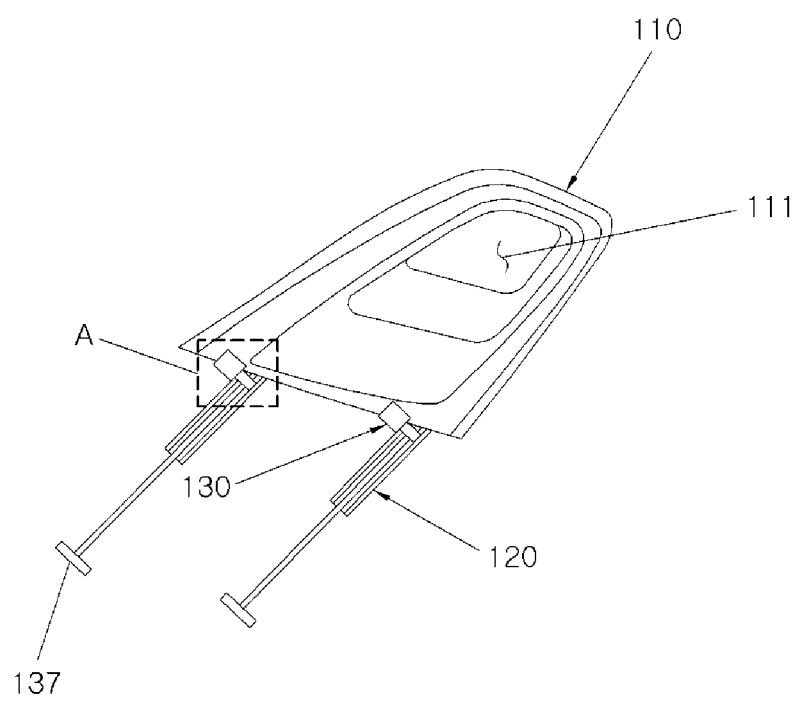
FIG. 3A and FIG. 3B are conceptual views illustrating the operation of the pop-up device for the butterfly door grip handle according to the various exemplary embodiments of the present invention.
Figure 3B:
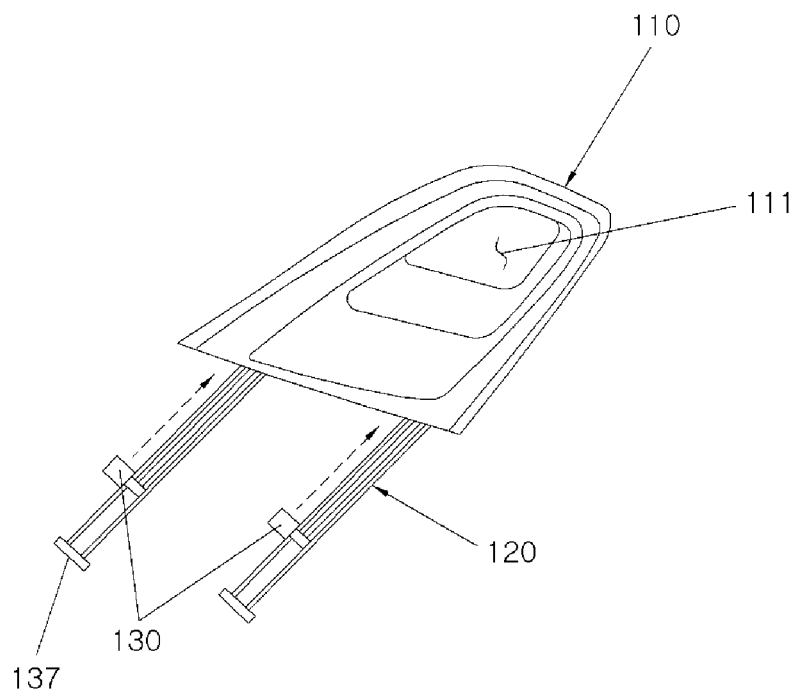
Figure 4:
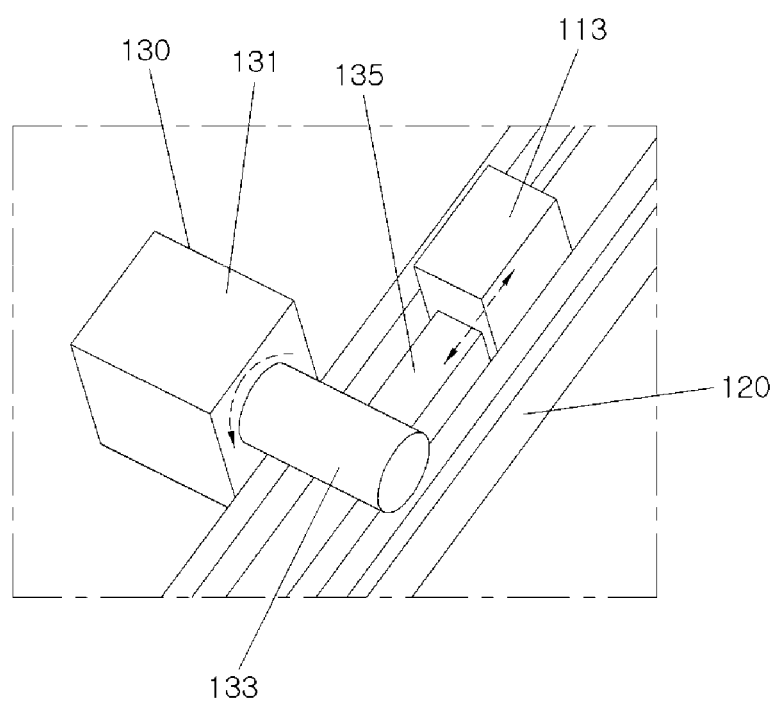
FIG. 4 is a conceptual view illustrating a drive device of the pop-up device for the butterfly door grip handle according to the various exemplary embodiments of the present invention.

FIG. 2 is a perspective view illustrating a pop-up device for a butterfly door grip handle according to various exemplary embodiments of the present invention. FIGS. 3a and 3b are conceptual views illustrating the operation of the pop-up device for the butterfly door grip handle according to the various exemplary embodiments of the present invention. FIG. 4 is a conceptual view illustrating a drive device of the pop-up device for the butterfly door grip handle according to the various exemplary embodiments of the present invention.

Referring to FIG. 2, FIG. 3 and FIG. 4, the pop-up device 100 for the butterfly door grip handle according to the various exemplary embodiments of the present invention includes a grip handle device 110, a guide device 120 and a first drive device 130.

The grip handle device 110 includes an inner grip handle, an outer grip handle, and a reinforcement which is mounted between the inner grip handle and the outer grip handle to enhance the stiffness of the grip handle device 110. However, the configuration of the grip handle device 110 is not limited to this.

The grip handle device 110 is mounted to a door trim 11 of the butterfly door 10. A first end portion of the grip handle device 110 is formed of a grip handle protruding in a handle shape, and a through hole 111 is formed in the first end portion of the grip handle device 110 so that an enhanced grip sensation can be provided to the user when opening the door.

A second end portion of the grip handle device 110 is coupled to a rack 135 of a first drive device 130 by a coupling roller 113.

The guide device 120 is mounted at the grip handle device 110 so that the coupling roller 113 that is provided on the second end portion of the grip handle device 110 and coupled to the rack 135 can linearly move along the guide device 120.

Accordingly, the grip handle device 110 can be linearly moved by the first drive device 130 in a predetermined first direction.

In the instant case, the first direction may be set within a range from 0° to 90° based on the lower end portion of the butterfly door 10. the first direction is set to 45° so that, as shown in the left view of FIG. 2, when the grip handle device 110 is popped up linearly, the grip handle device 110 can be disposed as close to an occupant who sits on a corresponding seat as possible.

The guide device 120 is fixed at a predetermined position in the door trim 11 and is configured to guide the grip handle device 110.

The guide device 120 may be formed of a rail including steel. of course, the guide device 120 may be formed of a plastic rail so long it can reliably guide the rack 135.

Although, in this embodiment, the guide device 120 has been illustrated as having a rectangular shape, it may have a circular shape.

A first end portion of the guide device 120 is fixed to a lower part of the door trim 11, and a second end portion thereof is penetrated into the grip handle device 110.

The first drive device 130 operates the grip handle device 110 in response to a signal of opening or closing the butterfly door.

The first drive device 130 includes a step motor 131, a pinion 133, the rack 135 and a first stopper 137.

The step motor 131 generates rotating drive force in response to a signal of opening or closing the butterfly door. The pinion 133 is provided on an end portion of the step motor 131. The step motor 131 rotates the pinion 133.

The pinion 133 is coupled to the step motor 131. The rack 135 is linearly moved by the rotational motion of the pinion 133.

The rack 135 is coupled to the pinion 133 and is configured to convert the rotational motion of the pinion 133 into linear motion. The rack 135 reciprocates in the first direction under the guide of the guide device 120. The first stopper 137 is provided under a lower end portion of the rack 135.

The first stopper 137 that is provided under the lower end portion of the rack 135 reciprocates below the guide device 120 to the lower end portion of the guide device 120.

That is, when the butterfly door 10 is closed, the first stopper 137 is moved to a position farthest from the guide device 120. When the butterfly door 10 opens, the first stopper 137 can move to the lower end portion of the guide device 120.

In this regard, when the grip handle device 110 is popped up in the first direction, not only can the distance that the grip handle device 110 is popped up be limited by the first stopper 137, but the grip handle device 110 can also be stably supported by the first stopper 137.

Meanwhile, body sizes of occupants, particularly, the lengths of the arms, differ from each other. Given this, the grip handle device 110 may be configured such that it linearly moves to a predetermined length under control of a control device.

For example, the length to which the grip handle device 110 is popped up may be set to three to five kinds of pop-up lengths corresponding to various body sizes of occupants. A plurality of pop-up lengths are previously inputted to a storage device, and the grip handle device 110 may be configured such that it is popped up by the controller always to the pop-up length preset by the occupant. Furthermore, the grip handle device 110 may be configured such that the length to which it is popped-up is adjusted by a button.

Accordingly, in an exemplary embodiment of the present invention, in response to a signal of opening the butterfly door, the grip handle device 110 can be popped up to be disposed as close to the occupant as possible in accordance with the body size of the occupant.

Figure 5:
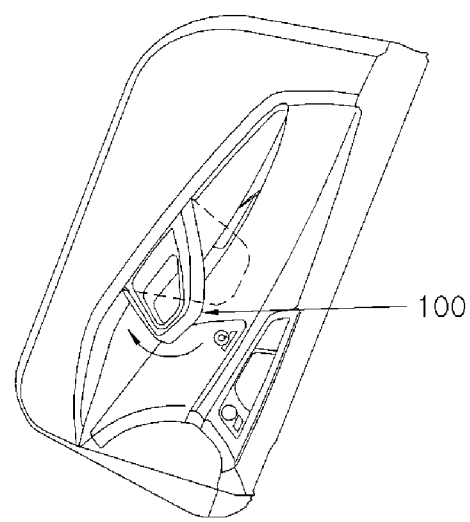
FIG. 5 is a perspective view illustrating a pop-up device for a butterfly door grip handle according to various exemplary embodiments of the present invention.
Figure 6:
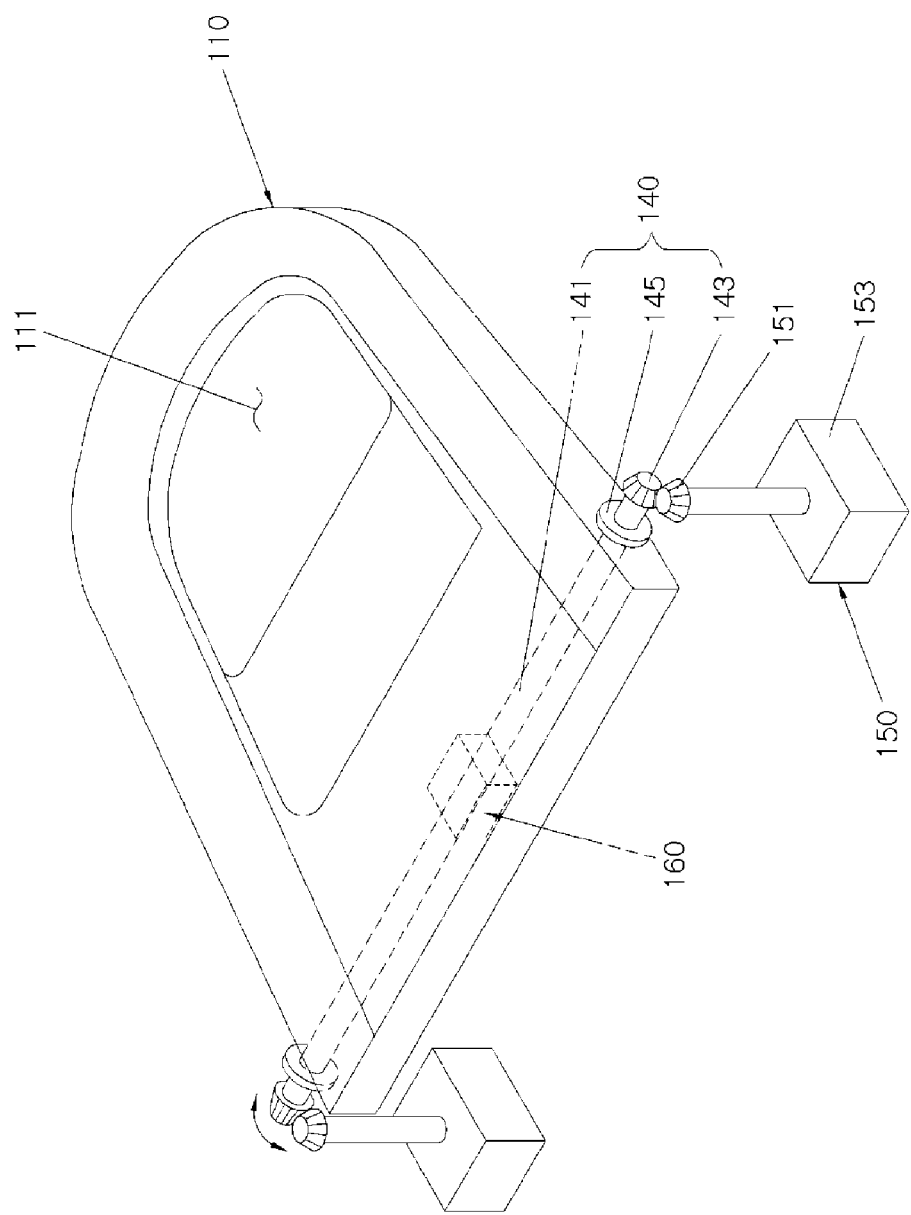
FIG. 6 is a conceptual view illustrating the operation of the pop-up device for the butterfly door grip handle according to the various exemplary embodiments of the present invention.

FIG. 5 is a perspective view illustrating a pop-up device for a butterfly door grip handle according to various exemplary embodiments of the present invention. FIG. 6 is a conceptual view illustrating the operation of the pop-up device for the butterfly door grip handle according to the various exemplary embodiments of the present invention.

The pop-up device for the butterfly door grip handle according to the various exemplary embodiments of the present invention corresponds to the pop-up device for the butterfly door grip handle according to the various exemplary embodiments. Therefore, the same reference numerals are used to designate the same or similar components. Hereinafter, explanation of the pop-up device according to the various exemplary embodiments will be focused on differences from that of the various exemplary embodiments.

The pop-up device for the butterfly door grip handle according to the various exemplary embodiments of the present invention includes a grip handle device 110, a hinge device 140 and a second drive device 150.

The grip handle device 110 is mounted to the door trim 11 of the butterfly door 10. A first end portion of the grip handle device 110 is formed of a grip handle protruding in a handle shape, and a through hole 111 is formed in the first end portion of the grip handle device 110 so that an enhanced grip sensation can be provided to the user when opening the door.

The hinge device 140 is provided on a second end portion of the grip handle device 110. The grip handle device 110 can be rotated by the hinge device 140.

The hinge device 140 includes a hinge rod 141 which is fixed to the second end portion of the grip handle device 110, and a first bevel gear 143 and a hinge shaft 145 which are provided on each of the first and second end portions of the hinge rod 141.

The hinge rod 141 is fixed to the lower end portion of the grip handle device 110. The hinge shafts 145 are provided on the respective first and second end portions of the hinge rod 141. The hinge shafts 145 are fixed to predetermined portions of the door trim 11 so that the grip handle device 110 can be rotated around the hinge shafts 145.

The first bevel gears 143 are provided on the respective first and second end portions of the hinge rod 141, and each of the first bevel gears 143 is coupled to a corresponding second bevel gear 151 so that the hinge rod 141 may be rotated by the power of the second drive device 150.

The second drive device 150 includes the second bevel gear 151 which engages with the first bevel gear 143, and a motor device 153 which generates rotating force to be applied to the second bevel gear 151.

In response to a signal of opening or closing the butterfly door, the motor device 153 of the second drive device 150 is configured to be operated so that the power of the motor device 153 is transmitted to the second bevel gear 151 and the first bevel gear 143, wherein the grip handle device 110 can be rotated to a predetermined first angle.

That is, the grip handle device 110 may be rotated to the predetermined first angle by the second stopper 160 provided inside the door trim 10.

In this regard, when the grip handle device 110 is popped up in the first angle, not can the angle at which the grip handle device 110 is popped up be limited by the second stopper 160, but the grip handle device 110 can also be stably supported by the second stopper 160.

The grip handle device 110 is formed to be inclined at an angle ranging from 60° to 90° based on the lower end portion of the butterfly door 10.

In the various exemplary embodiments of the present invention, there is illustrated an example in which the grip handle device 110 is formed at 90°, that is, vertically, based on the lower end portion of the butterfly door 10. In the case where the grip handle device 110 is formed at 90°, when the grip handle device 110 is configured to move linearly, it may be rather further away from the occupant.

Due to this, in the various exemplary embodiments of the present invention, the grip handle device 110 is configured to rotate toward the occupant so that, when the butterfly door opens, the grip handle device 110 is rotated toward occupant to reduce the distance between the grip handle device 110 and the occupant.

Meanwhile, body sizes of occupants, particularly, the lengths of the arms, differ from each other. Given this, the grip handle device 110 may be configured such that it is rotated by a predetermined angle under control of the control device.

For example, the angle by which the grip handle device 110 is popped up may be set to a plurality of pop-up angles corresponding to various body sizes of occupants. A plurality of pop-up angles are previously inputted to the storage device, and the grip handle device 110 may be configured such that it is popped up by the control device continuously by the predetermined pop-up angle. Furthermore, the grip handle device 110 may be configured such that the angle by which it is popped-up is adjusted by a button.

Accordingly, in an exemplary embodiment of the present invention, in response to a signal of opening the butterfly door, the grip handle device 110 can be popped up to be positioned as adjacent to the occupant as possible in accordance with the body size of the occupant.

Figure 7:
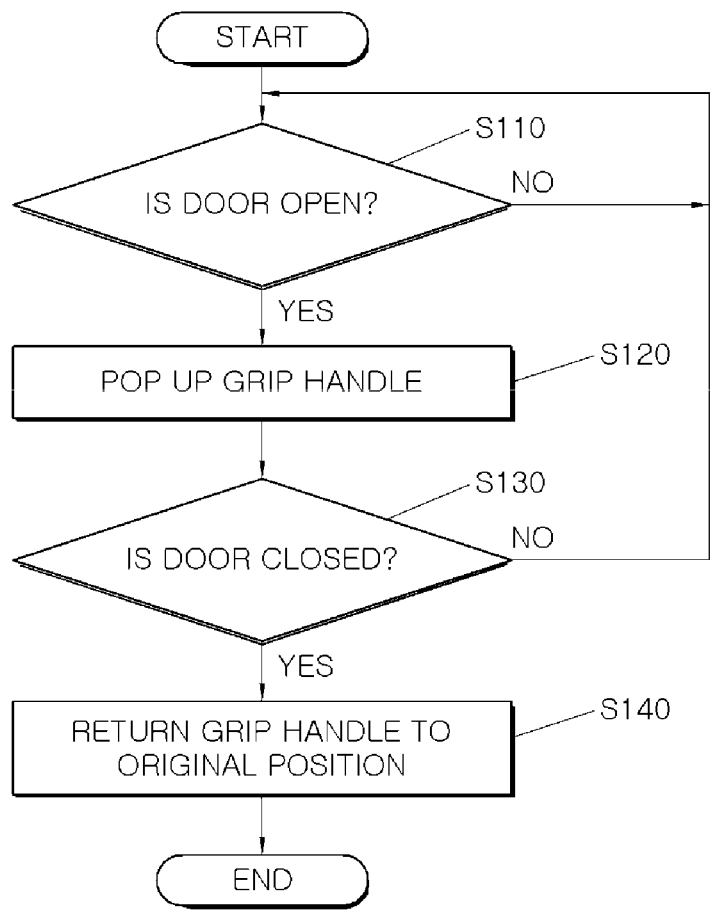
FIG. 7 is a flowchart illustrating a method of popping up the butterfly door grip handle according to the present invention.

FIG. 7 is a flowchart illustrating a method of popping up the butterfly door grip handle according to an exemplary embodiment of the present invention.

The method of popping up the butterfly door grip handle according to an exemplary embodiment of the present invention includes a first determination step S110 of determining whether the butterfly door is in an open state; a pop-up step S120 of popping up the grip handle device 110 when the butterfly door is in the open state at the first determination step S110; a second determination step S130 of determining whether the butterfly door is in a closed state after the pop-up step S120; and a returning step S140 of returning the grip handle to its original position when the butterfly door is in a closed state at the second determination step S130.

In detail, whether the butterfly door is in the open state is first determined. In the case where the butterfly door is in the open state, the grip handle device is popped up. In this regard, the term "pop-up" means that the grip handle device rotates or linearly moves in a longitudinal direction toward a driver or occupant. After the grip handle device of the butterfly door has been popped up, the driver or occupant grasps the grip handle device to close the butterfly door. When it is checked by the control device that the butterfly door has been closed, the grip handle device returns to its original position by rotating or linear motion.

At the first determination step S110, whether the butterfly door is in the open state is determined using an ajar switch. Although not shown, a vehicle body control module may be used to check a door state signal, that is, whether the door is in the open state or the closed state. The vehicle body control module is an indispensable device which is typically provided in a vehicle; therefore, detailed explanation thereof will be omitted.

Although not shown in this specification, the control device receives a door state signal from the vehicle body control module by the ajar switch and generates a drive signal when the door is opened or closed. It is preferable that the control device be embodied by a control device including a central processing device, a microcomputer, a microprocessor, and a controller.

At the pop-up step S120, the grip handle device 110 may be linearly moved by the first drive device 130 in the predetermined first direction.

That is, the first drive device 130 operates the grip handle device 110 in response to a signal of opening or closing the butterfly door. In other words, when the butterfly door opens, the first drive device 130 is operated, and the grip handle device 110 is thus linearly popped up.

At the pop-up step S120, the grip handle device 110 is linearly moved by a predetermined length under control of the control device. That is, the length to which the grip handle device 110 is popped up may be set to three to five kinds of pop-up lengths corresponding to various body sizes of occupants. A plurality of pop-up lengths are previously inputted to a storage device, and the grip handle device 110 may be configured such that it is continuously popped up by the controller to the pop-up length predetermined by the occupant. Furthermore, of course, the grip handle device 110 may be configured such that the length to which it is popped-up is adjusted by a button.

At the pop-up step S120, the grip handle device 110 may be driven in a rotating manner by the second drive device 150.

That is, the second drive device 150 rotates the grip handle device 110 in response to a signal of opening or closing the butterfly door. In other words, when the butterfly door opens, the second drive device 150 is operated, and the grip handle device 110 is thus rotated in a predetermined direction.

Here, the grip handle device 110 may be formed at 90°, that is, vertically, based on the lower end portion of the butterfly door 10. In the case where the grip handle device 110 is formed at 90°, when the grip handle 110 is configured to move linearly, it may be rather further away from the occupant.

Due to this, the grip handle device 110 may be configured to rotate toward the occupant so that, when the butterfly door opens, the grip handle device 110 is rotated toward occupant to reduce the distance between the grip handle device 110 and the occupant.

At the pop-up step S120, the grip handle device 110 may be configured to be rotated by a predetermined angle by the control device.

That is, body sizes of occupants, particularly, the lengths of the arms, differ from each other. Given this, the grip handle device 110 may be configured such that it is rotated by a predetermined angle under control of the controller.

In other words, the angle by which the grip handle device 110 is popped up may be set to a plurality of pop-up angles corresponding to various body sizes of occupants. A plurality of pop-up angles are previously inputted to the storage device, and the grip handle device 110 may be configured, wherein it is popped up by the control device continuously by the predetermined pop-up angle. Furthermore, the grip handle device 110 may be configured such that the angle by which it is popped-up is adjusted by the button.

At the pop-up step S120, the pop-up operation of the grip handle device 110 may be limited by the first and second stoppers 137 and 160. That is, in the case where the grip handle device 110 is fixed to the door trim 11, there is no problem with the coupling strength between the grip handle device 110 and the door trim 11 even when the driver or occupant pulls the grip handle device 110 with comparatively large force. However, in the case where the grip handle device 110 is configured such that it is popped up as in an exemplary embodiment of the present invention, there is probability that the grip handle device 110 that is in the maximum pop-up state is undesirably removed from the door trim 11. Due to this, in an exemplary embodiment of the present invention, the first and second stopper 137 and 160 are provided so that even when the grip handle device 110 is in the maximum pop-up state, the grip handle device 110 can be stably maintained at its original position and prevented from being removed from the door trim.

As described above, a pop-up device for a butterfly door grip handle according to an exemplary embodiment of the present invention pops up a grip handle device in response to a signal of opening a butterfly door so that a manipulation distance can be reduced when the butterfly door is manually closed.

Furthermore, in the pop-up device for the butterfly door grip handle according to an exemplary embodiment of the present invention, in response to a signal of opening the butterfly door, the grip handle device can be popped up to be disposed as close to the occupant as possible in accordance with the body size of an occupant.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pop-up device for a grip handle that is mounted in a butterfly door, the pop-up device comprising:
    a grip handle device including a first end portion formed to protrude in a handle shape from a door trim of the butterfly door;
    a guide device fixed at a predetermined position in the door trim and configured to guide the grip handle device; and
    a first drive device configured to drive the grip handle device in response to a signal of opening or closing the butterfly door,
    wherein the guide device is penetrated into the grip handle device so that the grip handle device is linearly moved by the first drive device in a predetermined first direction.

2. The pop-up device of claim 1, wherein the first drive device includes:
    a step motor configured to generate rotating force in response to the signal of opening or closing the butterfly door;
    a pinion coupled to the step motor; and
    a rack configured to convert a rotational motion of the pinion into a linear motion.

3. The pop-up device of claim 2, wherein a second end portion of the grip handle device is coupled to a first end portion of the rack by a coupling roller and guided by the guide device.

4. The pop-up device of claim 2, wherein a stopper is provided on a second end portion of the rack.

5. The pop-up device of claim 1, wherein the grip handle device has a through opening in an upper end portion thereof.

6. A method of popping up the grip handle mounted in the butterfly door according to claim 1, the method comprising:
    a first determination operation of determining whether the butterfly door is in an open state;
    a pop-up operation of popping up the grip handle device when the butterfly door is in the open state in the first determination operation;
    a second determination operation of determining whether the butterfly door is in a closed state after the pop-up operation; and a returning operation of returning the grip handle device to an original position thereof when the butterfly door is in the closed state in the second determination operation.

7. The method of claim 6, wherein the first determination operation includes determining whether the butterfly door is in the open state using an ajar switch.

8. The method of claim 6, wherein, in the pop-up operation, the grip handle device is linearly moved by the first drive device in the predetermined first direction.

9. The method of claim 8, wherein, in the pop-up operation, the grip handle device is linearly moved by a predetermined length by a control device.

10. The method of claim 6, wherein, in the pop-up operation, the popping-up of the grip handle device is limited by a stopper.

* * * * *